June 4, 1940.  A. M. TEEVIN  2,203,552
WARM AIR REGISTER
Filed March 18, 1939
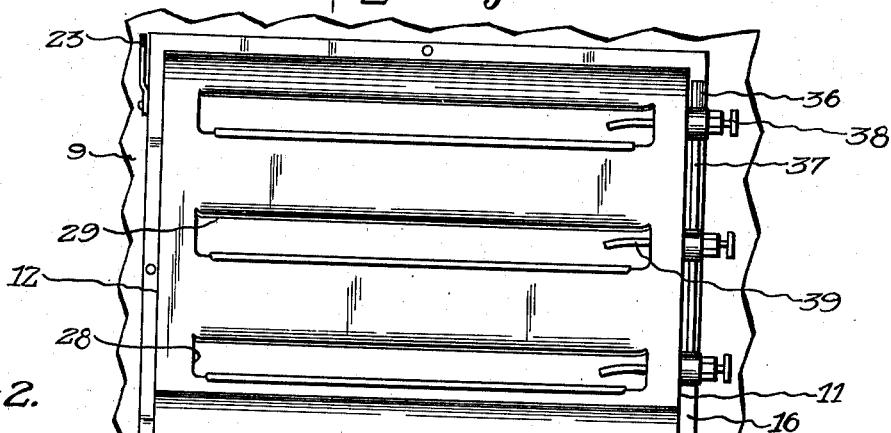
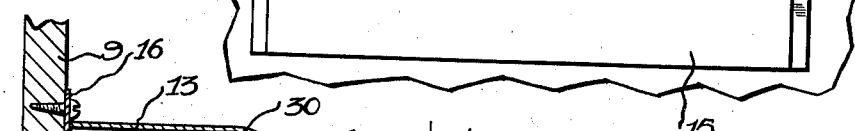
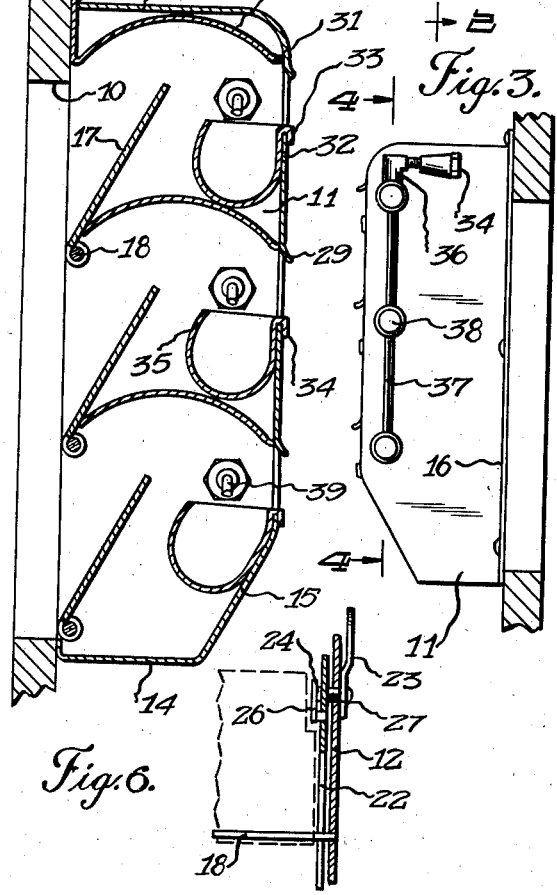
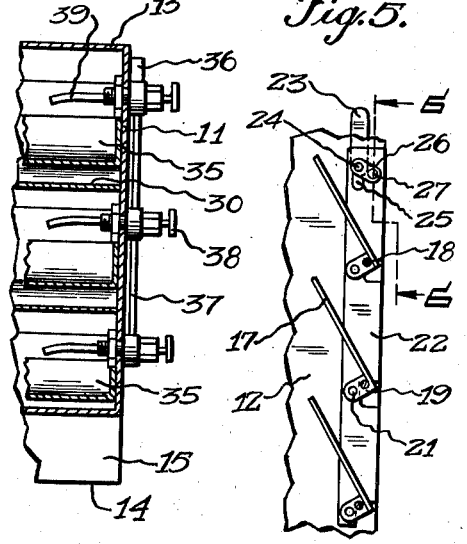
Alexander M. Teevin INVENTOR.
BY Thos. F. Donnelly ATTORNEY.

Patented June 4, 1940

2,203,552

UNITED STATES PATENT OFFICE 2,203,552

WARM AIR REGISTER

Alexander M. Teevin, Detroit, Mich.

Application March 18, 1939, Serial No. 262,679

5 Claims. (Cl. 261—119)

My invention relates to a new and useful improvement in a warm air register adapted for use as a warm air register for positioning over the warm air outlet on warm air heating installations.

It is an object of the present invention to provide a warm air register so arranged and constructed that the usual control of the warm air issuing from the outlet may be present and operable, while, at the same time, a means is provided for humidifying the air issuing from the outlet.

Another object of the invention is the provision of a device so constructed and arranged that a large portion of the dust and foreign solid material traveling with the air may be trapped and prevented from issuing into the room.

Another object of the invention is the provision of a warm air register having a humidifying apparatus mounted therein and so arranged and constructed that the air is caused to travel a maximum distance in the moist atmosphere created by the humidifying device.

Another object of the invention is the provision of a warm air register so arranged and constructed that the air issuing therefrom will issue in downwardly directed currents.

Another object of the invention is the provision of a device of this class which will be simple in structure, economical in manufacture, durable, compact, easily and quickly installed, and highly efficient in use.

Other objects will appear hereinafter.

The invention consists in the combination and arrangement of parts hereinafter described and claimed.

The invention will be best understood by a reference to the accompanying drawing which forms a part of this specification, and in which:

Fig. 1 is a front, elevational view of the invention.

Fig. 2 is a sectional view taken on line 2—2 of Fig. 1, slightly enlarged.

Fig. 3 is a side, elevational view of the invention.

Fig. 4 is a fragmentary, sectional view taken on line 4—4 of Fig. 3.

Fig. 5 is a fragmentary, side, elevational view from the side opposite to the side shown in Fig. 3.

Fig. 6 is a fragmentary, sectional view taken on line 6—6 of Fig. 5.

As shown in the drawing, the invention is adapted for mounting on a wall 9 having an opening 10 which serves as the outlet for the air conduit. The invention comprises a box-like housing having oppositely disposed side walls 11 and 12, a top wall 13, a bottom wall 14, and a front wall 15. The sides and the top of this house are welded or otherwise suitably secured to a U-shaped frame which projects beyond the outer surface thereof to form a securing flange 16 through which screws or other suitable fastening means are projected for securing the device to the wall 9.

Pivotally mounted on and positioned between the side walls 11 and 12 are control shutters 17, each of which is pivoted at its lower end to a rod 18 mounted on these oppositely disposed side walls. Each of these shutters is provided at one of its ends with the outwardly projecting lug 19 having a slot 20 formed therein through which is extended a pin 21 which serves to connect each of the shutters to an actuating bar 22 which is slideably vertically in contact with the inner face of the side wall 12. Positioned exterior of the side wall 12 is an operating finger 23 pivoted on a pin 24 which extends through the slot 25 formed in the bar 22. Fixedly attached to the inner end of the pin is one end of a link 26, the opposite end of which carries a pin 27 which is attached to the bar 22, this bar 22 being provided with the elongated slot 25 so that it may move vertically, relative to the location of the pin 24. By rocking the finger 23 on the pin 24, as a pivot, the shutters may be moved to opened or closed position.

The forward wall 15 of the housing is provided with the spaced outlet slots 28 and this wall at the upper edge of each of these slots is placed outwardly to provide the deflecting lip 29. Mounted in the housing above the motion of each of the shutters 17 is an arcuate deflecting plate 30 which extends from the rear to the forward side of the housing. The forward edge of this deflecting plate 30 is angularly turned as at 31 and brought into engagement and connected to the inner surface of the wall 15 by welding or in any other suitable manner. At each of the slots 28, I provide a trough 32 which extends from side wall to side wall of the housing and which has the doubling-over flange 33 which snaps over the lower edge 34 of the slots 28. It will be noted that the inner side 35 of the trough, adjacent its upper end, is curved or formed arcuate. The purpose of this arcuate formation is to cooperate with the arcuate deflecting plate 30 so that the air is deflected into a position to travel over the surface of water which may be in the trough 32.

To provide water for the trough, there is attached to the outer surface of the side wall 11 a delivery pipe 36 carrying a fitting 34 to which a water pipe may be attached. This delivery pipe communicates with the pipe 37 through which there is positioned a valve 38 at each of the troughs. This valve communicates with a pipe 39 leading inwardly to the trough. This construction is such that by adjusting the valve 38, a dripping of water into the troughs may be permitted at a rate according to the return of pressure. By this means, there is consequently maintained a quantity of water in the trough at a predetermined height, and by forcing the air to travel over the surface of this water, foreign particles may be trapped and the air may also be humidified.

In this way, I have provided a register whereby cleanliness may be attained, greater comfort provided by having the air properly humidified, and a neat and attractive register control provided.

While I have illustrated and described the preferred form of construction, I do not wish to limit myself to the precise details of structure shown, but wish to avail myself of such variations and modifications as may come within the scope of the appended claims.

What I claim as new is:

1. A device of the class described, comprising: a box-like structure adapted for mounting over a warm-air outlet; a front wall on said structure having a plurality of slots formed therein; an outwardly projecting tongue on said wall along the upper edge of each of said slots, said tongue being directed downwardly for deflecting air passing through said slots; an arcuate partition in said structure at each of said slots and terminating at its forward edge in engagement with the inner face of said wall immediately above the slot and thence extending rearwardly to the rear of said structure.

2. A device of the class described, comprising: a box-like structure adapted for mounting over a warm-air outlet; a front wall on said structure having a plurality of slots formed therein; an outwardly projecting tongue on said wall at the upper edge of each of said slots, said tongue being directed downwardly for deflecting air passing through said slots; an arcuate partition in said housing at each of said slots and terminating at its forward edge in engagement with the inner face of said wall immediately above the slot and thence extending rearwardly to the rear of said structure, the rear wall of each of said troughs being curvilinear to provide a convex surface to air traveling toward the slot.

3. A device of the class described, comprising: a box-like structure adapted for mounting over a warm-air outlet; a front wall on said structure, said front wall having a plurality of elongated parallel extending slots formed therein; a shield positioned on said front wall overhanging each of said slots and directed upwardly for deflecting air passing through the slots in a downward direction; a trough at each of said slots; a flange projecting upwardly from the upper side of said trough and doubled over each of said walls at each of said slots and mounting the trough in position immediately below the slot, the rear wall of said troughs being curvilinear to present a concave surface to air passing through the slot; means for delivering water to each of said troughs; a control means for each of said troughs for controlling the delivery of water thereto; and an arcuate partition mounted on said structure engaging at its forward edge with the inner face of said wall above each of said slots and thence extending rearwardly of said structure, the concave face of said partition being faced downwardly of the troughs above the slots.

4. A device of the class described, comprising: a box-like structure adapted for mounting over a warm-air outlet; a front wall on said structure, said front wall having a plurality of elongated parallel extending slots formed therein; a shield positioned on said front wall overhanging each of said slots and directed upwardly for deflecting air passing through the slots in a downward direction; a trough at each of said slots; a flange projecting upwardly from the upper side of said trough and doubled over each of said walls at each of said slots and mounting the trough in position immediately below the slot, the rear wall of said troughs being curvilinear to present a concave surface to air passing through the slot; means for delivering water to each of said troughs; a control means for each of said troughs for controlling the delivery of water thereto; an arcuate partition mounted on said structure engaging at its forward edge with the inner face of said wall above each of said slots and thence extending rearwardly of said structure, the concave face of said partition being faced downwardly of the troughs above the slots; a plurality of shutters at the rear of said structure; and means exterior of said structure for moving said shutters to open or closed position for controlling the flow of air into said structure.

5. A device of the class described comprising a box-like structure adapted for mounting over a warm air outlet, side walls, a bottom, a top and a front wall on said structure, said front wall having a plurality of slots formed therein; a water receiving trough positioned below and extending longitudinally of each of said slots, the rear wall of said trough being formed curvilinear; an arcuate partition in said structure in each of said slots and extending longitudinally thereof with its concave face directed downwardly toward a slot and terminating at its forward edge in engagement with the inner face of said front wall immediately above the slot and thence extending rearwardly and terminating at its rear end at the rear edge of said side walls.

ALEXANDER M. TEEVIN.